United States Patent [19]

Sprouse

[11] 4,451,295

[45] May 29, 1984

[54] CEMENTS, MORTARS AND CONCRETES

[75] Inventor: James H. Sprouse, El Toro, Calif.

[73] Assignee: Standard Concrete Materials, Inc., Santa Ana, Calif.

[21] Appl. No.: 426,679

[22] Filed: Sep. 29, 1982

[51] Int. Cl.$^3$ ............................................. C04B 7/14
[52] U.S. Cl. ........................................ 106/89; 106/90; 106/117; 106/118; 106/120
[58] Field of Search ................ 106/117, 118, 120, 89, 106/90

[56] References Cited

U.S. PATENT DOCUMENTS 1,837,072  12/1931  Sassur ................................ 106/117
2,065,126  12/1936  Echberg ............................. 106/117

*Primary Examiner*—James Poer
*Attorney, Agent, or Firm*—Grover A. Frater

[57] ABSTRACT

An improved cement for making concrete and mortar comprises a blend of ground calcium carbonate or Portland cement kiln dust, or both, and ground, granulated blast furnace slag. While its physical and chemical characteristics differ from Portland cement, it is a functional substitute for Portland cement and may be used in combination with Portland cement in a wide range of proportions. The hardening and other characteristics of this slag-dust cement can be improved by the addition of $SO_3$, ordinarily by adding ground gypsum and by the use of accelerators and high-range water reducing formaldehyde compounds.

10 Claims, No Drawings

CEMENTS, MORTARS AND CONCRETES

TECHNICAL FIELD

This invention relates to improvements in cements, mortars and concretes.

BACKGROUND ART

Portland cement is the most widely used cementitious material in making mortar and concrete. It is made by heating argillaceous and calcareous materials to fusion. A "clinker" is formed. When finely ground, the clinker material becomes Portland cement. If the cement is mixed with an aggregate material and water it "sets" hydraulically and hardens to strong and durable form. Mortars may include a substance, usually lime, to control plasticity, but the primary difference between mortar and concrete lies in the size and proportion to cement of aggregate material. Portland cement concrete and mortar are both functionally satisfactory. Accordingly, proposed substitute and alternative materials are usually evaluated by comparison with Portland cement.

About 700 million tons of mortar and concrete are used annually in the United States. It has been calculated that Portland cement production in the United States consumes between 500 and 600 trillion BTUs annually. That is about two percent of all of the energy consumed in the nation's industrial processes. Little has been done in the United States to find suitable substitutes for Portland cement, but in some industrialized, energy-poor countries blast furnace slag is substituted for part of the Portland cement in making concrete.

Slag is a by-product of blast furnace iron production. The blast furnace is charged with iron ore, limestone or dolomite flux stone and coke. Molten iron and molten slag are produced. The slag is drawn off at about 2700° F. and resembles flowing lava. It consists of silica and alumina derived from the ore combined with calcium oxide and magnesium oxide from the flux stone. If permitted to cool slowly it crystalizes and exhibits no cementitious quality. However, if cooled quickly, as by quenching in water, the slag becomes granular. If the granular material is finely ground it can be used as a substitute for Portland cement. It hydrates readily in the presence of activators including potassium hydroxide, sodium hydroxide, gypsum and calcium hydroxide which is released during the hydration of Portland cement.

In the United States the American Society for Testing Materials has published a specification for a blended cement ASTM Type 1S consisting of granulated blast furnace slag and Portland cement. Its chemical and physical requirements are set out in specification ASTMC 595-76 which defines it to be an "intimate and uniform blend of Portland cement and fine granulated blast furnace slag produced either by intergrinding Portland cement clinker and granulated blast furnace slag or by blending Portland cement and finely ground granulated blast furnace slag, in which the slag constituent is between 25 and 65 percent of Portland blast furnace slag cement."

In an extensive review of the literature prepared by D. R. Lankard, "The performance of Blended Cements in Concrete Viewed in Relation to the Potential Offered by These Cements for Reducing Energy Consumption in Cement Manufacture," an Interim Technical Report to the Federal Energy Administration by Battelle, Columbus, Ohio, September 1977, he points out the inferiorities of concretes containing granulated blast furnace slag compared to those with ordinary Portland cement. These are: (1) slag cement concrete normally has a longer setting time than Portland cement concrete; and (2) the compressive strength of slag cement concrete is usually less than that of Portland cement concrete for curing ages between 7 and 28 days.

The invention combines ground blast furnace slag with kiln dust or ground calcium carbonate, or both, to form a superior cement and admixture for Portland cement. Those combinations are believed to be new. Kiln dust is a by-product of Portland cement production. It contains some Portland cement fines but is essentially a different material comprising mostly partly calcined material and alkalies. If released to the atmosphere it is a serious pollulant. Release is forbidden by law. In some political jurisdictions it may be recycled by returning it to the Portland cement kiln, but in other jurisdictions it is required to be collected and removed from the cement making process. In practice, it is collected as waste to remove the alkalies. High alkali content in the Portland cement results in inferior mortar and inferior concrete.

Limestone is the most important source of calcium carbonate. It is abundant in or near every land area of the world.

DISCLOSURE OF INVENTION

One object of the invention is to provide a cement which can be produced from waste materials whereby to permit substantial savings in energy and in production cost.

Another object is to produce a superior cement with which to make mortar and concrete.

In the invention granulated blast furnace slag is thoroughly mixed or "blended" with kiln dust, the waste product of the Portland cement production process or with calcium carbonate, or both. The result is a cementitious, hydraulic setting product that can be substituted for all or part of the Portland cement in mortar and concrete. The undesirable effects that characterize the retention of highly alkaline kiln dust in Portland cement are avoided in large measure by inclusion of the slag. As much as half dust and/or calcium carbonate, and even more, can be included in the blend even when no Portland cement is included.

Extensive testing has demonstrated that concrete made according to the invention is excellent for use in both concrete and mortar, particularly when the slag-dust-calcium carbonate blend includes one-half or more of slag. The most useful range of proportions extends from ninety parts slag and ten parts kiln dust and/or calcium carbonate to seventy parts slag and thirty parts dust and/or calcium carbonate. The proportion of that blend to Portland cement is variable over the full range from all slag-dust-calcium carbonate to all Portland cement except that hardening is slowed materially in concretes and mortars made with twenty percent or less of Portland cement.

Tests indicate that for use in concrete the best blend comprises about four parts by weight of slag to one part of calcium carbonate or of kiln dust, or both. That ratio makes a good strong cement when mixed with Portland cement in any ratio of the blend to Portland cement from one to four to all blend. Strength is less when the mixture includes only twenty percent or less of Portland cement. However, it is possible, and even likely, that the reduction in strength when the percentage of Portland cement is low is simply the manifestation of slower hardening that occurs when higher proportions of Portland cement are included.

While the rate of initial compressive strength increase is generally less in slag-dust-calcium carbonate mortar and concrete than in those made with Portland cement, the difference can be overcome with conventional accelerators like calcium chloride and the non-chlorinated accelerators such as calcium formate and calcium nitrate and other compounds.

In general, these additives and those that permit the use of less water have an effect on slag-dust-calcium carbonate cements comparable to their effect on Portland cement. There is a difference, however. The addition of calcium chloride has more acceleration effect in the initial stages, the first few days of hardening, whereas the non-chloride accelerators exhibit acceleration over a longer period.

Unless the application dictates otherwise, the preferred form of the invention includes an accelerator. Whether it be a chloride or non-chloride accelerator, or both, depends upon what hardening rate is desired.

The preferred form of the invention also includes gypsum or, more particularly, the $SO_3$ that is found in gypsum. The inclusion of this material improves strength and, except in blends that include large proportions of Portland cement, it serves as an accelerator of the hardening process.

It has been discovered that the use of high-range water reducers such, for example, as sulfonated melamine formaldehyde condensates and/or sulfonated napthalene formaldehyde condensates, are especially useful in combination with blends of ground granulated blast furnace slag and kiln dust and/or calcium chloride, preferably with sypsum, to provide normal setting time and strength gain. These materials may be used to replace, or may be used in addition to, both the chloride and non-chloride accelerators.

While testing of blends employing calcium carbonate has not been as complete as testing with blends employing kiln dust without calcium carbonate, it now appears that kiln dust and ground calcium carbonate are nearly one-for-one alternatives in their performance as ingredients in concretes and mortars which incorporate ground granulated blast furnace slag.

Kiln dust and ground limestone are not equivalents in the sense that they provide identical results in a blend with slag. However, the same ratios that produce the best results in slag-kiln dust-Portland cement blends, appear to provide the best results in slag-ground limestone-Portland cement blends. Moreover, the characteristics of both forms of these blends are readily controlled with formaldehyde compounds and gypsum. As a consequence, combinations of ground limestone and kiln dust can be substituted for either ground limestone or kiln dust.

It is not known why that is true, but the fact that it is makes the invention especially useful because its economic and energy saving benefit is not limited to the availability of kiln dust as an ingredient. Cement formulations can be selected on the basis of the availability and relative cost of ground limestone and kiln dust wherever granulated slag is available.

DESCRIPTION OF THE PREFERRED EMBODIMENT

Because blast furnace slag and kiln dust are waste products and can be prepared and blended at low additional energy cost, the preferred form from an energy (and cost) saving standpoint is a concrete and mortar made from slag-dust cement. Alternatively, the preferred form is a cement for use in making concrete and mortar which combines blast furnace slag and kiln dust. Since kiln dust is the by-product of Portland cement production and is produced along with Portland cement, the preferred forms of cement include those that combine slag-dust cement with Portland cement.

However, in regions where kiln dust is not readily available, or where the supply is limited, the preferred cements combine slag and ground limestone ($CaCO_3$).

In preferred form the cement contains or is combined with gypsum or other source of $SO_3$ and an accelerator, either calcium chloride or a non-chloride form.

While they are not entirely equivalent, the slag-dust-ground calcium carbonate cement is a substitute for Portland cement in terms of volume and function. The amount of water and the amount and kind of aggregate and other ingredients of mortar and concrete are the same whether the cement be made of slag and calcium carbonate or dust, Portland cement, or a combination of them. Slump tests, setting time tests, and others, show that mortars and concretes made with slag and dust cement are workable or more workable than those made with Portland cement. That appears to be true, too, of slag and ground limestone blends. Thus, the skills involved in making and working Portland cement mortars and concretes are immediately applicable to cements, mortars and concretes made according to the invention.

Some examples are described below along with their properties. The sand used in these tests was screened to remove all particles larger than No. 8 mesh. Grain sizes were as follows:

| | |
|---|---|
| 26% | 8 to 16 mesh |
| 27% | 16 to 30 mesh |
| 26% | 30 to 50 mesh |
| 16% | 50 to 100 mesh |
| 5% | 100 to 200 mesh. |

Mortar mixes were prepared with the sand described above. The ratio of the ground granulated blast furnace slag-kiln dust blend and/or Portland cement to fine sand was 1:2.75. Five hundred grams of blend and/or Portland cement was mixed with 1375 grams of sand. The amount of water used in each mortar mixture was controlled to yield a mixture having a flow of between 105 and 110 when measured on a flow table meeting requirements of ASTM C230-68. The flow of a mortar is the resulting increase in average base diameter of the molded mortar mass, expressed as a percentage of the original base diameter when the table upon which the mortar has been molded is raised and dropped one-half inch twenty-five times in fifteen seconds. The mortars were mixed in accordance with ASTM C305.

Cylindrical specimens two inches by four inches were cast to be tested at ages of seven days, 28 days, and, in some instances, 56 days.

Whenever slag-dust mortars were mixed, a control mix containing only Portland cement, sand and water was mixed and subsequently tested at the same time. The data thus obtained established a reference against which the mortars containing slag and kiln dust were compared.

Mortar mixes containing ground granulated blast furnace slag, various percentages of cement kiln dust, ground gypsum, non-chloride and chloride accelerators were made with cement replacements of forty percent, sixty percent and eighty percent. Data on these mixtures are shown in Tables III, IV, and V, respectively.

The non-chloride accelerator used in the mortar series was in liquid form and its dosage rate shown is expressed in fluid ounces per 100 pounds of slag-dust blend. The ground gypsum, when used, had a dosage rate based on the slag content. The ground gypsum's $SO_3$ content by weight of slag is shon in Tables III, IV and V.

Calcium chloride solution was used in the mixes shown in Tables III, IV, and V. The material, when used in a mix, was used at the rate of one percent CaCl by weight of total blend of slag-dust.

In making the concretes, the sand described above was combined with pea gravel and one inch coarse gravel in the ratio forty-two percent sand, eleven percent pea gravel and forty-eight percent coarse gravel. The gypsum was ground to a minimum of eighty-eight percent passage through a No. 325 sieve.

Except in the case of the Type 1 cement used in the tests described in Table IX, one brand of cement from the same mill was obtained in a sample large enough to use in all mixes containing Portland cement.

Two non-chloride accelerators were used. One was in liquid form, the other in finely divided dry form. In the following Tables the liquid non-chloride accelerator is shown as fluid ounces per 100 pounds of slag-dust blend. The powdered non-chloride accelerator is shown in percent by weight of the slag-dust blend.

Another very important feature of the invention is the use of a high-range water reducer in combination with the blast furnace slag and kiln dust blend. Whether or not Portland cement forms one of the ingredients, the amount of high-range water reducer can be calculated as a percentage by weight of the slag-dust blend component of the mixture. About one-half of one percent by weight of the reducer is usually adequate. The addition of the reducer to the slag-dust mixture is comparable in function to adding it to Portland cement. It serves as a substitute for water in improving workability. The degree of its effectiveness is different in the case of slag-dust cement than it is in the case of Portland cement. That is illustrated in Table IX.

In terms of hardening rate, and some other characteristics, high-range water reducers are alternatives to or substitutes, in whole or in part, for the accelerators. The combination of high-range water reducer and non-chloride accelerator is preferred over the combination of high-range water reducer and chloride accelerator.

Further, it is possible to omit gypsum, or more particularly $SO_3$ from the slag-dust, high-range water reducer combination, but the inclusion of $SO_3$ is preferred.

The ground gypsum was analyzed and found to be approximately 22 percent $SO_3$. The dosage rates for $SO_3$ in the tables following is based on the percent by weight of the ground granulated blast furnace slag content in the mixture.

The concrete mixtures were batches and mixed in accordance with ASTM C192-76 "Standard Method of Making and Curing Test Specimens in the Laboratory."

The compressive strength specimens were tested in accordance with ASTM C39-72.

Shrinkage tests (volume change) were conducted on specimens made from some mixtures. This was done in accordance with ASTM C157-75 on four inch by four inch by eleven inch specimens.

Twelve cylindrical specimens were made from each test batch. Two shrinkage specimens were made from each batch so tested.

The time of setting of the various concrete mixtures was determined by using the method described in ASTM C807-75, on mortar screened from the concrete through a No. 8 mesh sieve.

The unit weight of every concrete mixture was determined, and used as the basis for calculating the actual quantities of each ingredient in the concretes on a per cubic yard basis. Consistency of the concrete mixtures was determined by the Slump Test, ASTM C143-78.

The composition of the ground granulated blast furnace slag, the cement kiln dust and the Portland cement (Type II) and their physical characteristics are shown in Tables I and II, respectively.

The nominal chemical analysis of the ground granulated blast furnace slag, the Portland Type II cement, and the cement kiln dust was as shown in Table I.

TABLE I

| Material | Slag | Cement | Dust |
|---|---|---|---|
| Ca O, % | 41 | 63 | 52 |
| $S_1 O_2$, % | 34 | 22 | 10 |
| $Al_2 O_3$, % | 16 | 4 | 3 |
| $Fe_2 O_3$, % | 1 | 3 | 1.5 |
| Mg O, % | 5 | 4 | 2 |
| Alkali | 0.5 | 0.5 | 2 |

Physical characteristics of the ground granulated blast furnace slag and the cement kiln dust used, with various percentages of Portland cement and screened sand to make mortars, are shown in Table II.

TABLE II

| Material | Slag | Dust |
|---|---|---|
| Characteristics | | |
| Specific Gravity | 3.11 | 2.83 |
| % Retained on #325 sieve | 5.28 | 21.88 |
| % Passing #325 sieve | 94.72 | 78.12 |
| Blaine Fineness, $cm^2$/gram | 3935 | 6381 |

In the tables that follow "Acc." means accelerator. The symbol "Y" in that column means one and one-half percent by weight of slag-dust blend of powdered non-chloride accelerator.

The symbol "X" means 16 fluid ounces of liquid per one hundred pounds of slag-dust blend. A numeral in that column means the number of fluid ounces of liquid accelerator per one hundred pounds of slag-dust blend.

The symbol "Z" means calcium chloride in the amount of one percent by weight of the combined weight of slag and dust.

While compressive strength, cure rate, and setting times vary, when some or all of the kiln dust is replaced with ground calcium carbonate no major change in result is experienced. Thus, the test data that follows can be taken as an indication of the performance of compositions in which the proportions of kiln dust to ground calcium carbonate varies from all of one to all of the other. However, subsequent testing has shown that formaldehyde compounds are especially important as additives in controlling the characteristics of blends which incorporate a preponderance of calcium carbonate.

TABLE III

MORTAR

40% Cement Replacement Compressive Strength Percent of Control

| Mix No. | Blend % Slag | % Dust | ACC. | SO$_3$, % of Slag | 7 days | 28 days | 56 days |
|---|---|---|---|---|---|---|---|
| 110 | 100 | | | | 70.0 | 97.0 | 106.6 |
| 200 | 100 | | X | | 88.3 | 113.1 | 112.8 |
| 211 | 100 | | 32 | | 83.6 | 111.2 | 117.4 |
| 213 | 100 | | 64 | | 91.2 | 110.0 | 125.0 |
| 65 | 100 | | | 0.47 | 72.0 | 98.3 | 101.1 |
| 72 | 100 | | | 0.94 | 80.5 | 100.6 | 114.0 |
| 79 | 100 | | | 1.41 | 87.1 | 90.5 | 105.5 |
| 111 | 90 | 10 | | | 75.2 | 94.7 | |
| 143 | 90 | 10 | X | | 89.8 | 115.0 | 111.9 |
| 240 | 90 | 10 | | 0.94 | 85.1 | 89.4 | |
| 232 | 90 | 10 | Z | | 101.1 | 97.3 | 101.2 |
| 160 | 90 | 10 | X | 0.94 | 83.3 | 112.0 | |
| 218 | 90 | 10 | Z | 0.94 | 96.1 | 99.3 | 91.5 |
| 171 | 90 | 10 | X | 0.94 | 108.2 | 112.3 | 111.4 |
| 113 | 70 | 30 | | | 78.6 | 87.4 | |
| 146 | 70 | 30 | X | | 95.8 | 109.7 | 111.9 |
| 241 | 70 | 30 | | 0.94 | 93.1 | 91.6 | |
| 235 | 70 | 30 | Z | | 99.7 | 96.0 | 101.2 |
| 163 | 70 | 30 | X | 0.94 | 86.9 | 106.5 | |
| 221 | 70 | 30 | Z | 0.94 | 92.6 | 101.9 | 94.7 |
| 174 | 70 | 30 | X | 0.94 | 104.6 | 98.2 | 109.1 |
| 115 | 50 | 50 | | | 74.3 | 79.3 | 83.3 |
| 149 | 50 | 50 | X | | 89.5 | 97.2 | 98.8 |
| 242 | 50 | 50 | | 0.94 | 88.7 | 85.0 | |
| 238 | 50 | 50 | Z | | 93.1 | 86.0 | 89.2 |
| 226 | 50 | 50 | X | 0.94 | 82.2 | 99.6 | |
| 224 | 50 | 50 | Z | 0.94 | 93.1 | 91.5 | 89.4 |
| 117 | 50 | 50 | Z | 0.94 | 95.1 | 91.5 | 96.0 |

TABLE IV

MORTAR

60% Cement Replacement Compressive Strength Percent of Control

| Mix No. | Blend % Slag | % Dust | ACC. | SO$_3$, % of Slag | 7 days | 28 days | 56 days |
|---|---|---|---|---|---|---|---|
| 104 | 100 | | | | 57.7 | 90.9 | 106.0 |
| 201 | 100 | | X | | 70.7 | 104.9 | 110.1 |
| 212 | 100 | | 32 | | 69.0 | 101.3 | 115.2 |
| 214 | 100 | | 64 | | 85.2 | 110.0 | 120.7 |
| 67 | 100 | | | 0.47 | 57.8 | 91.8 | 105.6 |
| 74 | 100 | | | 0.94 | 63.2 | 90.0 | 102.3 |
| 81 | 100 | | | 1.41 | 77.2 | 84.9 | 93.4 |
| 134 | 90 | 10 | | | 67.4 | 91.0 | 95.4 |
| 142 | 90 | 10 | X | | 84.4 | 107.4 | 111.8 |
| 243 | 90 | 10 | | 0.94 | 78.2 | 78.8 | |
| 231 | 90 | 10 | Z | | 82.4 | 88.0 | 94.0 |
| 159 | 90 | 10 | X | 0.94 | 78.1 | 98.4 | 85.1 |
| 217 | 90 | 10 | Z | 0.94 | 85.8 | 90.9 | 100.0 |
| 170 | 90 | 10 | XZ | 0.94 | 94.0 | 95.8 | 80.5 |
| 136 | 70 | 30 | | | 66.0 | 79.3 | 107.1 |
| 145 | 70 | 30 | X | | 89.8 | 100.0 | |
| 244 | 70 | 30 | | 0.94 | 71.8 | 80.4 | 89.2 |
| 234 | 70 | 30 | Z | | 82.8 | 82.7 | |
| 162 | 70 | 30 | X | 0.94 | 77.7 | 99.0 | 78.0 |
| 220 | 70 | 30 | Z | 0.94 | 78.4 | 85.1 | 97.7 |
| 173 | 70 | 30 | X | 0.94 | 84.9 | 87.1 | 74.9 |
| 138 | 50 | 50 | | | 56.6 | 68.8 | 86.9 |
| 148 | 50 | 50 | X | | 69.7 | 86.1 | |
| 245 | 50 | 50 | | 0.94 | 68.5 | 70.7 | 79.9 |
| 237 | 50 | 50 | Z | | 74.1 | 77.3 | |
| 225 | 50 | 50 | X | 0.94 | 73.9 | 90.9 | 78.7 |
| 223 | 50 | 50 | | 0.94 | 71.9 | 76.6 | 86.4 |
| 226 | 50 | 50 | X | 0.94 | 79.0 | 80.4 | |

TABLE V

MORTAR

80% Cement Replacement Compressive Strength Percent of Control

| Mix No. | Blend % Slag | % Dust | ACC. | SO$_3$, % of Slag | 7 days | 28 days | 56 days |
|---|---|---|---|---|---|---|---|
| 106 | 100 | | | | 44.2 | 74.4 | 89.0 |
| 202 | 100 | | X | | 69.8 | 92.5 | 103.4 |
| 152 | 90 | 10 | | | 61.0 | 73.6 | 84.2 |
| 141 | 90 | 10 | X | | 84.4 | 88.7 | 97.6 |
| 246 | 90 | 10 | | 0.94 | 72.6 | 73.5 | |
| 230 | 90 | 10 | Z | | 79.0 | 74.0 | 75.9 |
| 158 | 90 | 10 | X | 0.94 | 80.9 | 80.0 | |
| 216 | 90 | 10 | Z | | 79.0 | 74.0 | 75.9 |
| 169 | 90 | 10 | XZ | 0.94 | 87.9 | 82.7 | 81.8 |
| 154 | 70 | 30 | | | 54.5 | 67.6 | 69.5 |
| 144 | 70 | 30 | X | | 72.9 | 81.5 | 85.7 |
| 247 | 70 | 30 | | 0.94 | 66.9 | 66.7 | |
| 233 | 70 | 30 | Z | | 71.0 | 68.7 | 72.3 |
| 161 | 70 | 30 | X | 0.94 | 75.1 | 84.0 | |
| 219 | 70 | 30 | Z | 0.94 | 70.3 | 80.5 | 76.6 |
| 172 | 70 | 30 | XZ | 0.94 | 80.5 | 73.6 | 81.8 |
| 156 | 50 | 50 | | | 42.1 | 54.2 | 65.0 |
| 147 | 50 | 50 | X | | 40.4 | 51.2 | 52.4 |
| 248 | 50 | 50 | | 0.94 | 60.0 | 63.9 | |
| 236 | 50 | 50 | Z | | 62.4 | 62.0 | 63.3 |
| 164 | 50 | 50 | X | 0.94 | 59.0 | 73.5 | |
| 222 | 50 | 50 | Z | 0.94 | 62.1 | 68.8 | 67.0 |
| 175 | 50 | 50 | XZ | 0.94 | 71.3 | 67.8 | 77.3 |

TABLE VI

CONCRETE

| Lab No. | Cement % | Blend % Slag | % Dust | SO$_3$, % of Slag | Acc. | Slump Ins. | Set Time Hrs:Min |
|---|---|---|---|---|---|---|---|
| 70 | 100 | | | 1.2 | X | 6 | 3:29 |
| 71 | 50 | 80 | 20 | 1.2 | 32 | 6 | 4:15 |
| 72 | 50 | 80 | 20 | 1.2 | 32 | 6 | 3:56 |
| 73 | 50 | 100 | 0 | 1.2 | X | 6 | 3:41 |
| 74 | 50 | 100 | 0 | 1.2 | 32 | 6 | 3:10 |
| 78 | 100 | | | | | 3¼ | 3:35 |
| 79 | 50 | 80 | 20 | 0 | X | 3¼ | 3:35 |
| 83 | 100 | | | | | 3 | 3:15 |
| 84 | 50 | 80 | 20 | 2.5 | X | 2¼ | 3:38 |
| 85 | 50 | 80 | 20 | 2.5 | Y | 3¼ | 3:34 |
| 106 | 100 | | | | | 3¼ | 2:47 |
| 107 | 50 | 80 | 20 | 3.0 | Y | 3¼ | 3:10 |
| 108 | 50 | 80 | 20 | 3.0 | X | 3¼ | 3:20 |
| 109 | 50 | 70 | 30 | 3.0 | Y | 3¼ | 3:12 |
| 110 | 50 | 70 | 30 | 3.0 | X | 4 | 3:30 |
| 111 | 50 | 80 | 20 | 4.0 | Y | 3¼ | 3:13 |
| 112 | 50 | 80 | 20 | 4.0 | X | 3¼ | 3:33 |
| 113 | 50 | 70 | 30 | 4.0 | Y | 3¼ | 3:36 |
| 114 | 50 | 70 | 30 | 4.0 | X | 3¼ | 4:25 |
| 127 | 100 | | | | | 3¼ | 3:17 |
| 138 | 50 | 90 | 10 | 2.2 | | 3¼ | 4:25 |
| 139 | 50 | 90 | 10 | 3.3 | | 3 | 4:12 |
| 140 | 50 | 80 | 20 | 2.5 | | 3¼ | 4:20 |
| 141 | 50 | 80 | 20 | 3.8 | | 3¼ | 4:08 |

TABLE VII

CONCRETE

| Lab No. | Cement % | Blend % Slag | % Dust | SO$_3$, % of Slag | Acc. | Slump Ins. | Set Time Hrs:Min |
|---|---|---|---|---|---|---|---|
| 94 | 100 | | | | | 5¼ | 2:55 |
| 95 | 80 | 80 | 20 | 2.1 | X | 4¼ | 3:03 |
| 96 | 60 | 80 | 20 | 2.2 | X | 4¼ | 3:05 |
| 97 | 40 | 80 | 20 | 2.2 | X | 4 | 3:02 |
| 98 | 20 | 80 | 20 | 2.2 | X | 4¼ | 3:42 |
| 99 | 0 | 80 | 20 | 2.2 | X | 3¼ | 4:00 |
| 100 | 100 | | | | | 4¼ | 3:10 |
| 101 | 80 | 80 | 20 | 2.2 | Y | 5 | 3:42 |
| 102 | 60 | 80 | 20 | 2.2 | Y | 4 | 3:23 |
| 103 | 40 | 80 | 20 | 2.2 | Y | 4 | 3:22 |
| 104 | 10 | 80 | 20 | 2.2 | Y | 3¼ | 3:24 |

TABLE VII-continued

| Lab No. | Cement % | Blend % Slag | Blend % Dust | SO₃, % of Slag | Acc. | Slump Ins. | Set Time Hrs:Min |
|---|---|---|---|---|---|---|---|
| 105 | 0 | 80 | 20 | 2.2 | Y | 4 | 3:42 |
| 115 | 100 | | | | | 3¼ | 3:10 |
| 116 | 80 | 70 | 30 | 2.0 | Y | 3¼ | 3:12 |
| 117 | 60 | 70 | 30 | 2.0 | Y | 3¼ | 3:21 |
| 118 | 40 | 70 | 30 | 2.0 | Y | 3¼ | 3:23 |
| 121 | 100 | | | | | 3 | 2:53 |
| 122 | 80 | 100 | 0 | 2.2 | Y | 3 | 2:52 |
| 123 | 60 | 100 | 0 | 2.2 | Y | 3 | 2:50 |
| 124 | 40 | 100 | 0 | 2.2 | Y | 3¼ | 2:37 |
| 125 | 20 | 100 | 0 | 2.2 | Y | 3 | 2:21 |
| 126 | 0 | 100 | 0 | 2.2 | Y | 3 | 2:13 |
| 127 | 100 | | | | | 3¼ | 3:17 |
| 128 | 80 | 90 | 10 | 2.2 | Y | 3¼ | 3:26 |
| 129 | 60 | 90 | 10 | 2.2 | Y | 3¾ | 3:15 |
| 130 | 40 | 90 | 10 | 2.2 | Y | 3¼ | 3:06 |
| 131 | 20 | 90 | 10 | 2.2 | Y | 3¾ | 3:14 |
| 132 | 0 | 90 | 10 | 2.2 | Y | 4¼ | 3:32 |

TABLE IX

| Type Cem. | % Cem. | Blend % Slag | Blend % Dust | Water lbs. | Slump ins. | Set Time Hrs:Min. | Comp. Strength % of Control Days 1 | 3 | 7 |
|---|---|---|---|---|---|---|---|---|---|
| II | 100 | | | 332 | 3¼ | 3:33 | 100 | 100 | 100 |
| II | 50 | 80 | 20 | 317 | 3¼ | 3:42 | 75 | 115 | 111 |
| I | 100 | | | 329 | 3 | 4:11 | 100 | 100 | 100 |
| I | 50 | 80 | 20 | 307 | 3 | 4:15 | 74 | 94 | 95 |

High-range water reducer was included in the cement/blend mixes at 0.5% by weight of the weight blend.

I claim:

1. A product comprising a blend of granulated blast furnace slag and at least one of ground calcium carbonate and cement kiln dust in which the proportion of slag to ground calcium carbonate and cement kiln dust is between nine to one and one to one by volume.

2. The invention defined in claim 1 which further comprises a water reducing agent in the form of a sulfonated naphthaline formaldehyde condensate.

TABLE VIII

| Cement % | Blend % Slag | Blend % Dust | ACC | Compress. Strength Percent of Control Days 1 | 3 | 7 | 28 | Shrinkage (Vol. Change) Days Drying 14 | 21 | 28 |
|---|---|---|---|---|---|---|---|---|---|---|
| 100 | | | | 100 | 100 | 100 | 100 | .035 | .043 | .051 |
| 50 | 80 | 20 | X | 74 | 98 | 99 | 108 | .054 | .061 | .070 |
| 50 | 80 | 10 | X | 79 | 89 | 110 | 115 | .056 | .064 | .072 |
| 50 | 100 | 0 | X | 59 | 71 | 90 | 117 | .063 | .073 | .080 |
| 50 | 100 | 0 | X | 53 | 60 | 84 | 122 | .067 | .074 | .083 |
| 100 | | | | 100 | 100 | 100 | 100 | .032 | .041 | .049 |
| 50 | 80 | 20 | X | 96 | 93 | 110 | 106 | .052 | .061 | .066 |
| 50 | 80 | 20 | Y | 81 | 86 | 96 | 96 | .042 | .048 | .056 |
| 100 | | | | 100 | 100 | 100 | 100 | .033 | .038 | .044 |
| 80 | 80 | 20 | Y | 102 | 102 | 114 | 98 | .036 | .040 | .046 |
| 60 | 80 | 20 | Y | 104 | 108 | 116 | 105 | .042 | .047 | .054 |
| 40 | 80 | 20 | Y | 87 | 102 | 109 | 100 | .042 | .047 | .052 |
| 20 | 80 | 20 | Y | 68 | 104 | 100 | 90 | .035 | .039 | .044 |
| 0 | 80 | 20 | Y | 49 | 98 | 108 | 84 | .034 | .037 | .042 |
| 100 | | | | 100 | 100 | 100 | 100 | .036 | .041 | .047 |
| 50 | 80 | 20 | Y | 87 | 95 | 95 | 94 | .044 | .047 | .053 |
| 50 | 80 | 20 | X | 94 | 97 | 102 | 103 | .055 | .060 | .066 |
| 50 | 70 | 30 | Y | 87 | 91 | 93 | 88 | .047 | .051 | .057 |
| 50 | 70 | 30 | X | 90 | 89 | 98 | 98 | .053 | .059 | .064 |
| 50 | 80 | 20 | Y | 80 | 94 | 86 | 93 | .045 | .049 | .054 |
| 50 | 80 | 10 | X | 91 | 92 | 89 | 101 | .053 | .059 | .064 |
| 50 | 70 | 30 | Y | 82 | 86 | 91 | 92 | .045 | .050 | .056 |
| 50 | 70 | 30 | X | 85 | 91 | 98 | 95 | .053 | .057 | .063 |
| 100 | | | | 100 | 100 | 100 | 100 | .037 | .045 | .051 |
| 80 | 70 | 30 | X | 99 | 98 | 112 | 90 | .036 | .043 | .050 |
| 60 | 70 | 30 | X | 85 | 95 | 101 | 91 | .037 | .047 | .053 |
| 40 | 70 | 30 | X | 66 | 88 | 91 | 81 | .036 | .046 | .052 |
| 20 | 70 | 30 | X | 50 | 81 | 88 | 74 | .037 | .046 | .052 |
| 0 | 70 | 30 | X | 37 | 77 | 80 | 67 | .025 | .035 | .041 |
| 100 | | | | 100 | 100 | 100 | 100 | .033 | .041 | .047 |
| 80 | 100 | 0 | Y | 98 | 100 | 100 | 100 | .035 | .045 | .052 |
| 60 | 100 | 0 | Y | 81 | 85 | 83 | 98 | .043 | .054 | .062 |
| 40 | 100 | 0 | Y | 66 | 75 | 86 | 92 | .043 | .054 | .061 |
| 20 | 100 | 0 | Y | 52 | 74 | 81 | 84 | .042 | .050 | .055 |
| 0 | 100 | 0 | Y | 50 | 79 | 78 | 76 | .024 | .031 | .036 |
| 100 | | | | 100 | 100 | 100 | 100 | .031 | .039 | .048 |
| 80 | 90 | 10 | Y | 91 | 99 | 94 | 93 | .033 | .041 | .049 |
| 60 | 90 | 10 | Y | 77 | 87 | 92 | 92 | .034 | .042 | .050 |
| 40 | 90 | 10 | Y | 81 | 94 | 90 | 98 | .038 | .046 | .053 |
| 20 | 90 | 10 | Y | 64 | 86 | 91 | 92 | .034 | .043 | .051 |
| 0 | 90 | 10 | Y | 49 | 83 | 85 | 80 | .029 | .036 | .044 |
| 50 | 90 | 10 | | 73 | 80 | 77 | 91 | .035 | .044 | .051 |
| 50 | 90 | 10 | | 86 | 89 | 84 | 90 | .036 | .045 | .053 |
| 50 | 80 | 20 | | 86 | 86 | 84 | 86 | .041 | .048 | .056 |
| 50 | 40 | 20 | | 94 | 87 | 83 | 92 | .035 | .043 | .050 |

3. The invention defined in claim 1 which further comprises gypsum in which the $SO_3$ content by weight of slag is between one-half and one and one-half percent.

4. The invention defined in claim 1 which further comprises calcium chloride in the amount of one-half to one and one-half pounds per one hundred pounds of the combined weight of slag and dust.

5. The invention defined in claim 1 in which said blend includes a proportion of Portland cement not less than twenty percent by weight of the blend.

6. A cementitious product comprising the hydraulically set product of the combination of ingredients including blast furnace slag, water, and at least one of ground calcium carbonate and Portland cement kiln dust in which said combination of ingredients includes Portland cement in the amount of at least twenty percent by weight of the slag and dust and calcium carbonate.

7. The invention defined in claim 6 in which said cementitious product includes a slag and dust or calcium carbonate in the range of nine parts slag to one part dust and calcium carbonate to three parts slag to two parts dust and calcium carbonate.

8. The invention defined in claim 6 in which said combination of ingredients includes $SO_3$ in an amount corresponding by weight to at least one-half percent.

9. The invention defined in claim 1 which further includes Portland cement in the amount of at least twenty percent by weight of the slag and dust and calcium carbonate.

10. The invention defined in claim 9 which further comprises high-range water reducer in the amount of about one-half of one percent by weight of the combined weight of the slag and dust.

* * * * *